July 25, 1967 G. ABRAHAM 3,333,196

ELECTRICAL SWITCHING MEANS

Filed June 28, 1965 4 Sheets-Sheet 1

INVENTOR
GEORGE ABRAHAM

BY [signature] AGENT
[signature] ATTORNEY

INVENTOR
GEORGE ABRAHAM
BY Stanley C. Corwin AGENT
R. S. Sciascia ATTORNEY

July 25, 1967 G. ABRAHAM 3,333,196

ELECTRICAL SWITCHING MEANS

Filed June 28, 1965 4 Sheets-Sheet 3

INVENTOR
GEORGE ABRAHAM

BY Stanley C Corwin AGENT

ATTORNEY

ELECTRICAL SWITCHING MEANS

Filed June 28, 1965 4 Sheets-Sheet 4

INVENTOR
GEORGE ABRAHAM

BY Stanley C Corwin AGENT
ATTORNEY

United States Patent Office 3,333,196
Patented July 25, 1967

3,333,196

ELECTRICAL SWITCHING MEANS

George Abraham, 3107 Westover Drive SE., Washington, D.C. 20020

Filed June 28, 1965, Ser. No. 467,793
15 Claims. (Cl. 325—22)

The invention described herein may be manufactured and used by or for the Government of the United States of America for governmental purposes without the payment of any royalties thereon or therefor.

This application is a continuation-in-part of my copending application, Ser. No. 101,033, filed Apr. 5, 1961 (now abandoned).

This invention relates in general to solid state switching means and in particular to transceiver systems employing such switching means.

In echo ranging apparatus for obstacle detection, wherein a short impulse is transmitted periodically and reflections of the impulses are received at the same point, it is generally desirable to employ a transceiver system, that is, to employ the same antenna for both transmission and reception. This, of course, necessitates some means for automatically disassociating the receiver from the antenna during operation of the transmitter to prevent damage to the receiver. Generally such system also includes means for preventing useless absorption of power by the transmitter during reception. Transceiver systems frequently employ a spark discharge or gas tube type of duplexer; or, in microwave applications, a ferrite circulator might be employed. The spark discharge, the gas tube, and the ferrite type of duplexer have disadvantages which minimize their effectiveness in selected applications. For example, the spark discharge and the gas tube devices may be used in high power applications but both are relatively slow acting due to ionization delay and the spark discharge type is subject to spark deterioration. Likewise, the ferrite device introduces less time delay than the spark discharge on gas tube devices but is restricted in its power handling capacity by a heat dissipation consideration.

In view of the foregoing, the general purpose of the present invention is to provide a negative resistance switch which is readily triggered by exposure to any one of a variety of physical forces, such as light, heat, nuclear radiation, electromagnetic radiation or electric potential and which may be used as an improved duplexer. As a duplexer the negative resistance device of the present invention is caused to switch from a high impedance to a low impedance when exposed to the electromagnetic radiation. The negative resistance characteristic of the device and a second negative resistance characteristic generated within the device by the radiation or the characteristic of a second device are annihilated by each other due to the interaction of the characteristics under the influence of the radiation.

Accordingly, it is an object of this invention to provide a fast acting duplexer for use at a variety of frequencies.

It is another object of this invention to provide a fast acting, long life, high-low impedance switching device suitable for use in high power duplexer applications and the like.

It is another object to provide a negative resistance switch capable of being triggered by high frequency radiation.

Another object is to provide a switch which changes from a high impedance to a low impedance upon the interaction and annihilation of the negative resistance characteristics exhibited by the switch.

Another object of the present invention is to show a method of switching by the interannihilation of composite of S and N type negative resistance characteristics generated in devices exposed to high frequency radiation.

A further object is to provide a negative-resistance radiation sensitive switch exhibiting a change from high to low impedance upon the annihilation of its normal switching characteristic by the additional characteristic generated when the switch is subject to high frequency electromagnetic radiation, and the annihilation of the additional characteristic by the normal characteristic.

Other objects of this invention will be appreciated upon a more comprehensive understanding of the invention for which reference is made to the following specification and drawings wherein.

Figures 3, 4:
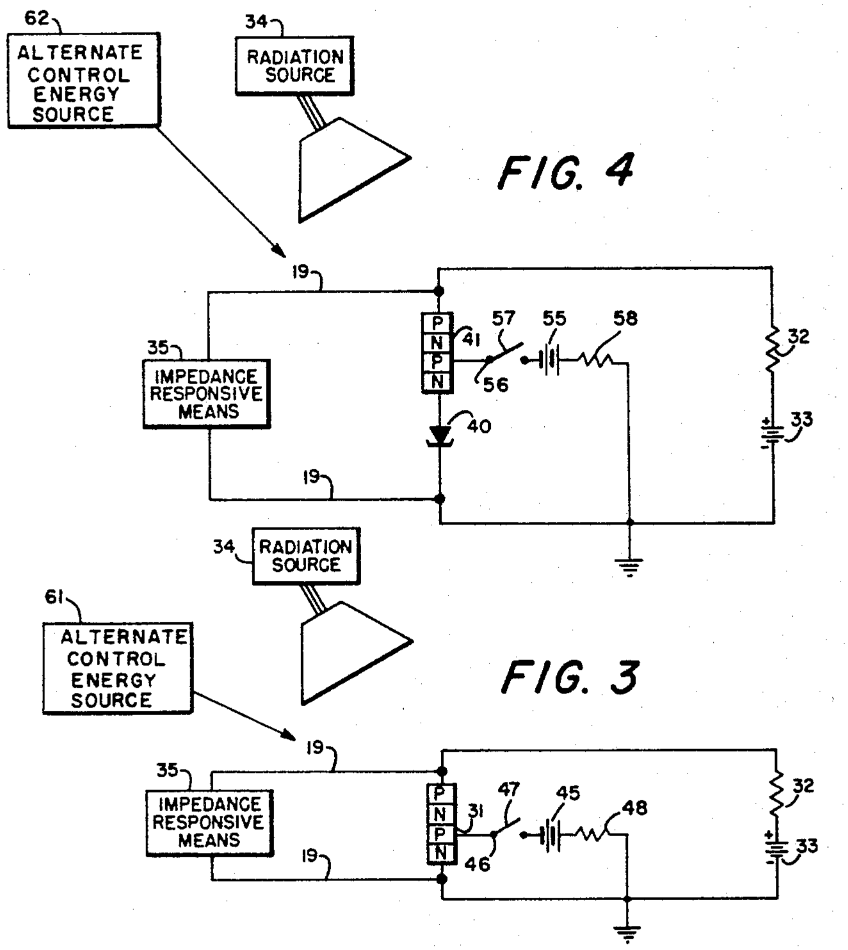
FIG. 3 is a schematic showing of the preferred switching device of this invention.
FIG. 4 is another schematic showing of the switching device of this invention.
Figure 5A:
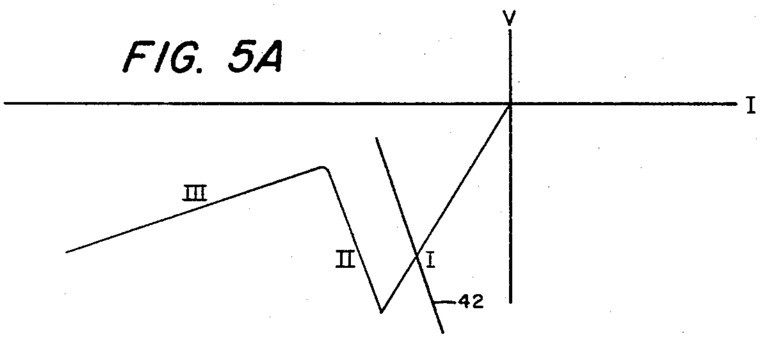

FIGS. 5*a*, *b* and *c* are negative resistance curves for the switching device of this invention as shown in the preferred embodiment of FIGURE 3.

Figures 6A, 6B:
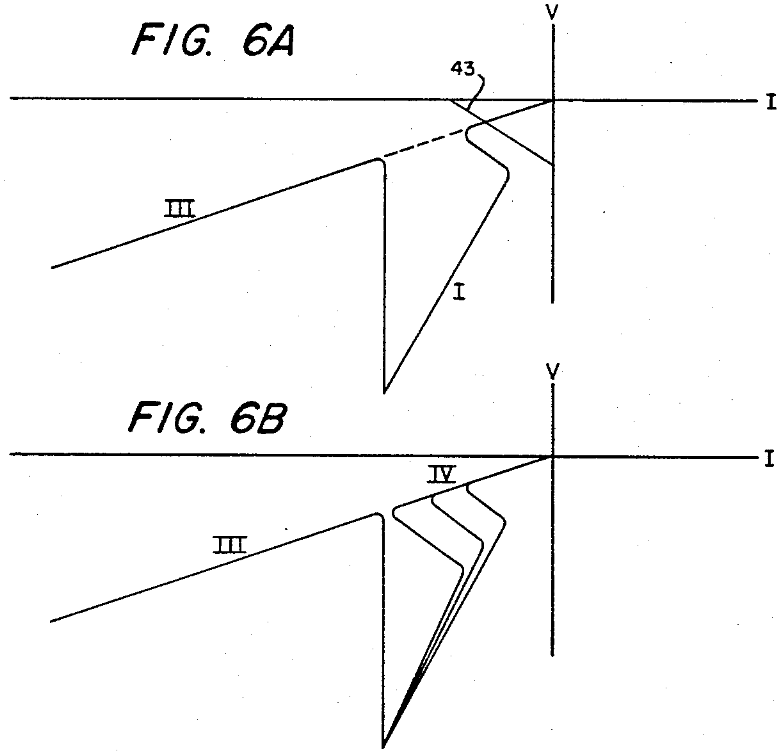

FIGS. 6*a*, *b* and *c* are negative resistance curves for the switching device of this invention as shown in the embodiment of FIGURE 4.

Briefly, this invention involves an improved high-low impedance solid state switching means triggered by high frequency radiation which, in the illustrated embodiments, is incorporated in a duplexer system to shunt the line at one or more suitable points therein such that the transmitter and the receiver are automatically disassociated, as desired.

Figure 1:
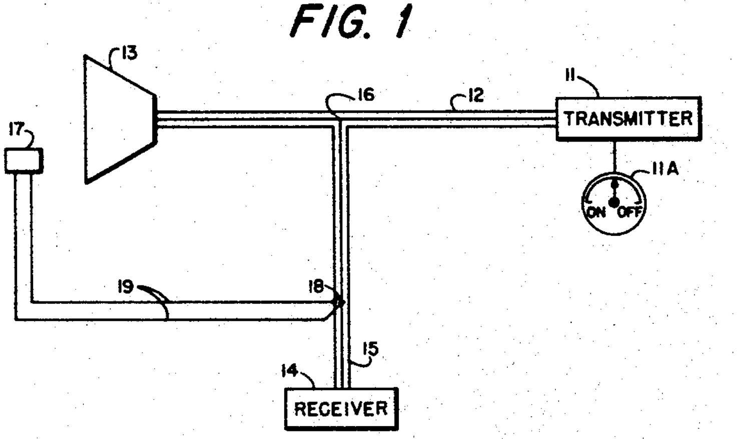
FIG. 1 is a pictorial showing of the device of this invention in one duplexer embodiment thereof.

Referring now to the drawings:

A coaxial duplexer system which incorporates the device of this invention in an operative arrangement is shown in FIG. 1. In this illustrated arrangement, switching means are provided to protect the receiver when the transmitter is in operation.

In FIG. 1 transmitter 11, controlled by off-on switch 11A is connected via the microwave transmission line 12 to the microwave antenna 13 to radiate energy in a selected pattern. Likewise, receiver 14 is connected via microwave transmission line 15 to the microwave transmission line 12 at point 16, the connection being spaced $n\lambda/4$ from antenna 13, where $n$ is an odd integer and $\lambda$ is the wavelength at the operating frequency of the system. In accordance with this invention, solid state impedance switching means 17 is disposed within the radiation pattern of the antenna 13 and electrically connected via lines 19 across the transmission line 15 at a selected point, indicated at 18, which is spaced $n\lambda/4$ from junction 16 of the transmission lines 12 and 15, where $n$ is an odd integer, preferably 1. It should be understood, however, that switching means 17 is shown in the radiation path of horn 13 merely for purposes of illustration, since any conduction path from the radiation source to the switch can be utilized. For example, as a practical matter, the switch could be located in close proximity to the receiver, shielded therefrom, and subjected to radiation via a transmission line from horn 13 or from transmission line 12. Since switch 17 is triggered by electromagnetic radiation, it is desirable to protect against possible switching by the voltage across line 15. The switch should be located at a point of voltage null along line 19, which connects the switch to the receiver feed line 15, to preclude this possibility. A further consideration is that the length of line 19 should be $n\lambda/4$, where $n$ is an even integer, to insure that the impedance of the switch appears directly at the receiver feed line.

It should be understood that even with line 19 limited in length, as set forth above, considerable freedom in switch placement is possible since the response time of most receivers is sufficient to permit reasonable time delay occasioned by the switch being located at a substantial distance from the receiver.

In operation of the system of FIG. 1, when the transmitter 11 is not feeding wave energy to antenna 13 to be radiated, the impedance of the solid state impedance switching means 17, in shunt with the transmission line 15 at point 18, is relatively high and the receiver 14 is properly matched to the antenna 13 to operate in a conventional manner. Upon energization of transmitter 11, antenna 13 radiates wave energy which acts on the solid state switching means 17 to immediately switch the impedance thereof to a lesser value. This switches the impedance at point 18 on transmission line 15 and effectively blocks the passage of the transmitter 11 output to the receiver 14. When transmission ceases, the impedance of the solid state switching means 17 is instantaneously switched back to its original value and the receiver is again properly matched to the antenna and ready for use.

Figure 2:
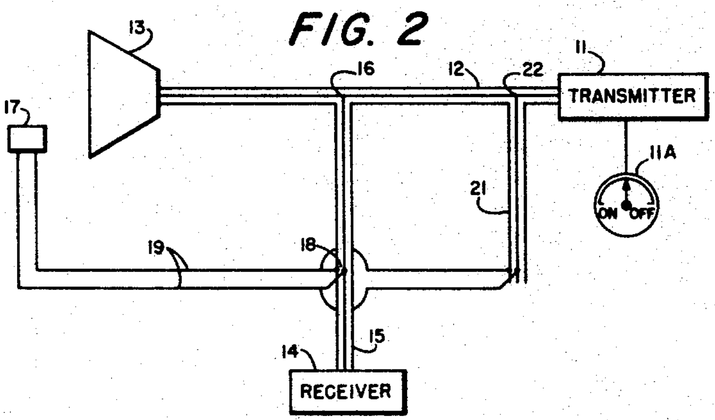
FIG. 2 is a pictorial showing of the switching device of this invention in another duplexer embodiment.

FIG. 2 depicts another embodiment of this invention wherein the solid state switching means 17 is electrically connected across the transmission line 15 at point 18 via lines 19, as in the embodiment of FIG. 1. In this embodiment, however, an additional stub transmission line 21 is connected in conventional manner to the transmission line 12, connecting the transmitter to the antenna at a point which is intermediate the junction of transmission lines 15 and 12 and the transmitter 11. In accordance with known transmitter isolation devices, the stub transmission line 21 is connected to the transmission line 12 at a selected point, indicated at 22, which is spaced $n\lambda/4$ from the junction, indicated at 16, where $n$ is an even integer, and the length of stub transmission line is $n\lambda/4$, where $n$ is an odd integer, such that when the impedance at the open end of the stub transmission line 21 is low, the impedance at junction 22 is high and when the impedance at the open end of the line 21 is high, the impedance at junction 22 is low.

Thus in operation of the system of FIG. 2, in the absence of radiation from transmitter 11 via the antenna 13, the impedance at point 16 on transmission line 12 and at the open end of the transmission line 21 is high. Accordingly, in the absence of radiation from the antenna 13, the receiver 14 is matched to the antenna and the transmitter is effectively disconnected such that it does not load the system. Of course, when antenna 13 does radiate the output of transmitter 11, the impedance at point 18, on transmission line 15 and at the open end of stub transmission line 21 is low and the receiver is effectively isolated.

The switching means 17, shown in block diagram in the duplex embodiments of FIGS. 1 and 2, is shown in more detail in FIG. 3. Here is shown an avalanche diode 31, often referred to as an N-type negative resistance device from the shape of the characteristic curve (FIG. *5a*) or as an open-circuit-stable semiconductor device (so called because it is possible to sweep out the characteristic curve with a constant-current source, namely a load line of approximately infinite or open circuit impedance, e.g. load line 42) connected across the series arrangement of impedance 32 and DC source 33. Across the output of avalanche device 31 is connected an impedance responsive means 35 which could be, for, example, the receiver of an echo-ranging apparatus as shown in FIGS. 1 and 2. The connection to the impedance responsive means is via lines 19, pointing up the relationship between the switch shown in FIGS. 3 and 4 and the duplexer embodiment of FIGS. 1 and 2. Electromagnetic energy radiation, such as the output of antenna 13 in FIGS. 1 and 2, is directed at the semiconductor 31 from a source, indicated at 34 in FIG. 4. Instead of the four-layer negative resistance avalanche diode shown, transistors or diodes may be used in a negative resistance mode or regenerative connection.

The switching device shown in FIG. 3 has different impedance values in each of the regions indicated as I, II and III in the typical open-circuit-stable characteristic curve of FIG. *5a*. In region I the resistive impedance is relatively high and is measured in megohms, region II is the region of negative resistance, and in region III, the resistive impedance is relatively low and is measured in ohms. Thus when the switching device 31 is energized by DC source 33 in the absence of radiation from source 34, the resistive impedance is relatively high.

When the switching device 31 is excited by radiation from source 34, however, the open-circuit-stable characteristic curve shown in FIG. *5b* is changed and a typical short-circuit-stable characteristic curve begins to develop at the point of origin. That is, at low values of current and voltage a region IV having a relatively low impedance, comparable to that of region III, a second negative resistance region V, and a region VI having a relatively high impedance, comparable to that of region I, is generated as a part of the characteristic curve. In addition, the avalanche breakdown potential is reduced, as shown by the alteration of the negative resistance region II. This phenomenon is portrayed by FIG. *5b*.

The short-circuit-stable or S-type negative resistance characteristic generated is the result of the exposure of the semiconductor to the electromagnetic radiation. If the frequency of the radiation source is high compared to the reciprocal of the effective life-time of the minority carriers of the semiconductor, minority carriers will accumulate lowering the impedance of the device resulting in a regenerative condition leading to a negative resistance characteristic.

As the energization from source 34 is increased, such as by movement of the device toward a maximum portion of the antenna radiation pattern, (a) greater number of stored minority carriers results, (b) avalanche breakdown potential is reduced, and (c) the open-circuit-stable negative resistance increases.

Thus the region IV is extended as shown in FIG. *5b* as the intensity of radiation from source 34 is increased until the region III of the open-circuit stable portion and the region IV of the short-circuit stable portion meet. At this meeting the N-type avalanche characteristic and the S-type minority carrier storage characteristic have annihilated each other and the resistive impedance of the switching device is relatively low, in the order of ohms.

In the duplexer embodiment of FIGS. 1 and 2, the device 31, incorporated in block 17, is placed at a point where the intensity is sufficient to produce the characteristic curve shown in FIG. *5c* wherein the negative resistance regions II and V and the resistive impedance region I are effectively eliminated.

FIG. 3 sets forth the preferred embodiment of the switching device of this invention, the use of one open-circuit-stable type of semiconductor as a radiation sensitive element offering numerable advantages of size, cost, etc. However, it is recognized that one semiconductor may be limited in terms of magnitude of impedance at the high-low levels and that some compromise might be necessary in selected applications.

Where the magnitude of impedance is of considerable importance and the highest and lowest values are desired, two semiconductors may be substituted, as shown in FIG. 4, for the one semiconductor device 31 in FIG. 3. In FIG. 4 semiconductor device 40 may be of the short-circuit-stable variety, so called because it is possible to sweep out the characteristic curve with a load line, e.g. load line 43, of approximately zero or short-circuit impedance, such as the tunnel diode shown, and semiconductor device 41 may be of the open-circuit-stable variety, such as the avalanche diode shown. The tunnel diode and avalanche diode are electrically connected in series so that the two characteristic curves combine as shown in FIG. 6*a*. In the case of FIG. 4, the magnitude of the higher impedance is determined by the open-circuit-stable semiconductor device 41 and the magnitude of the lower impedance is determined by the short-circuit-stable semiconductor or tunnel diode device 40.

Figure 5B:
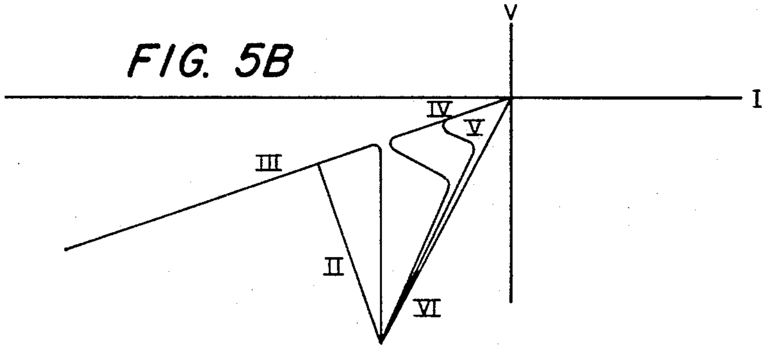
Figure 5C:
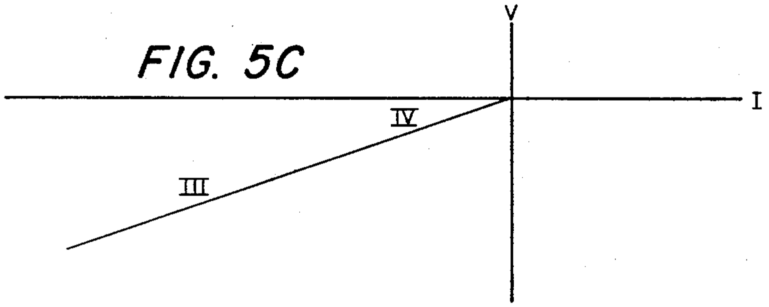
Figure 6C:
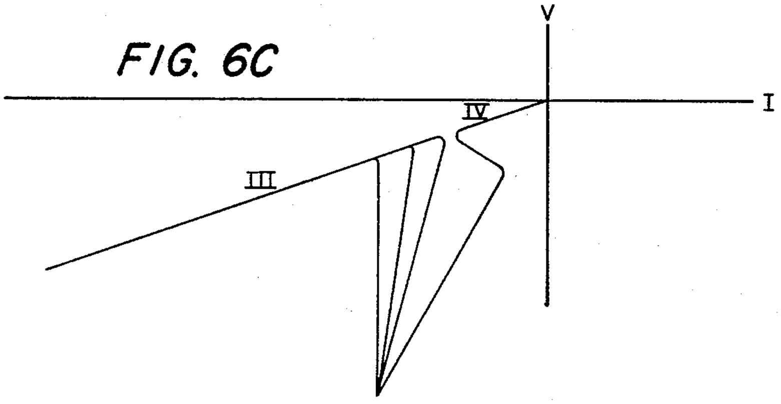

In the embodiment of FIG. 4, a characteristic curve such as indicated in FIG. 6*a* is obtained. In this embodiment, either the open-circuit-stable or the short-circuit-stable device may be employed as the radiation sensitive device. It is essential to this invention that at least one of these devices be radiation sensitive and that radiation be applied thereto. When the short-circuit-stable semiconductor device 40 is sensitive and is energized, as shown in FIG. 6*b*, the region IV is extended to reach region III. When the open-circuit-stable semiconductor device 41 is sensitive and is energized, region III extends to reach region IV as shown in FIG. 6*c*. In the remaining alternative, when both devices are sensitive and both are energized by radiation, both the regions III and IV are extended to meet at an intermediate point. The effect of the radiation in this case is the same as shown in FIG. 5*b* for the single open-circuit-stable device subjected radiation. Of course when only one device is sensitive, for example, when a relatively radiation insensitive short-circuit-stable tunnel diode, as shown in FIG. 4, is connected in series with a radiation-sensitive open-circuit-stable device, it is immaterial whether or not the tunnel diode is subjected to radiation. In each instance, the relatively high resistive impedance, measured across the devices in series in the absence of radiation, is replaced by relatively low resistive impedance when radiation is applied.

Solid state switching over several bands of frequencies has been obtained utilizing both diodes and transistors with a resultant high back to forward impedance ratio. In one particular instance, at X band frequencies, a 100 watt CW transmitter was employed to radiate via a horn antenna and a beaded N type, 5 ohm/cm. semiconductor was installed in the field of the antenna as the solid state switching element. The assembly provided an impedance variation from megohms without applied field to a few ohms with applied field. Similar results were obtained with other semiconductor switching elements including tunnel diodes, 4 layer avalanche diodes and with bipolar transistors.

The switching device of this invention has direct application in many diverse fields in addition to the field of duplexers as particularly described herein. For example, the device may be utilized as an astable multivibrator, oscillating when electromagnetic radiation is applied, or conversely, oscillating in the absence of radiation and being in an off state in the presence of this excitation. Also, the device may be utilized as a monostable or bistable multivibrator, switching in the presence or absence of electromagnetic radiation. It will be appreciated that the switching device of this invention has particular significance in computer circuitry application.

It is understood that electromagnetic radiation is only one of many known means for producing a short-circuit-stable negative resistance condition in selected semiconductors. Other energization means, such as a source of dynamic B+, which is defined in detail in my copending application Ser. No. 31,788, filed May 25, 1960, may be employed in electrical connection in the manner disclosed in said copending application or as shown in FIGS. 3 and 4 wherein DC sources 45 and 55 are coupled to control terminals 46 and 56 by switches 47 and 57 and wherein impedance means 48 and 58 are coupled between sources 45 and 55 and ground, respectively. It is also to be understood that the position of the control terminals 46 and 56 as shown in contact with the P-portions of semiconductor devices 31 and 41, respectively, are merely for purposes of explanation and that terminals 46 and 56 could be directly connected to any of the P or N regions of the devices 31 and 41 as long as the positive and negative terminals of the sources 45 and 55 are coupled to the N and P regions of devices 31 and 41, respectively.

Further, it is not necessary that the solid state switching device be connected directly across the transmission line in the duplexer embodiment. In such instance, the switching device may actuate other means, not shown, which serve to isolate in response to a selected negative resistance condition in said solid state device. For example, in very high power systems, the change from high to low impedance or other characteristic may be employed to actuate a fast acting high current relay which directly shunts the transmission line.

Also, it is understood that the device of this invention is not restricted to duplexer applications in coaxial antenna feed systems, as shown, but may be adapted to open wire parallel line and hollow waveguide applications, as well.

Further, it is understood that the device of this invention may be adapted to dosimeter sentinel applications, when radiation is to be avoided in selected areas for safety or other reason, by the incorporation of an alarm system responsive to the above described low resistive impedance condition.

Likewise, where the resistive impedance of the switching means of this invention is utilized as a load impedance in an electrical circuit, such as a multivibrator, the change in impedance produced by the incidence of radiation on the device may be employed to alter the output of said circuit in response thereto, in the case of a multivibrator to alter the frequency or to stop operation.

In addition, it is understood that this invention is not restricted to semiconductor devices. Other devices which are capable of exhibiting an open-circuit-stable negative resistance characteristic in the absence of electromagnetic radiation or dynamic B+ and are capable of exhibiting a short-circuit-stable negative resistance characteristic in the presence of such energization may be employed in the switching means of this invention.

The switching concept of the present invention has been described by way of radiation-sensitive duplexer example. The concept of generation of different kinds of negative resistance characteristics in a single device and the interaction of negative resistance characteristics in a plurality of devices, however, is not dependent upon exposure to electromagnetic radiation. Electromagnetic radiation serves as a control, much the same as the gate on a vacuum tube or the base on a transistor for determining the range or point of operation. When two-terminal negative resistance devices are employed, the control or triggering function may be performed by thermal, nuclear or optical exposure in the same manner as the electromagnetic radiation control herein described. The application of such energy is by means of alternate control energy sources 61 and 62, as shown in FIGS. 3 and 4 respectively, which sources are so named because the application of thermal, nuclear or optical energy to the thermal, nuclear or optical energy-sensitive semiconductor devices controls their negative resistance characteristics in a manner similar to the control exercised by electromagnetic radiation. It should also be realized that when two devices are employed, interaction of the different type negative resistance characteristics may be occasioned by varying electrical bias. Here, a third terminal on at least one of the devices may be actuated by an electrically applied source of control as shown in FIGS. 3 and 4, by terminals 46 and 56, respectively. In addition, electrical triggering can be effected without the use of a third terminal by application of positive potential between terminal point 19 and ground in FIGS. 3 and 4.

The basic concept of the present invention, switching by S and N type negative resistance interaction and annihilation, is thus not limited to the single control of exposure to electromagnetic radiation. Switching by negative resistance annihilation may be realized by utilizing any physical force to which a negative resistance device may be rendered sensitive to control the bounds of the negative resistance region of that device.

Since various changes and modifications may be made in the practice of the invention herein described without departing from the spirit or scope thereof, it is intended that the foregoing description shall be taken primarily by way of illustration and not in limitation except as may be required by the appended claims.

What is claimed:

1. Electrical switching means comprising a device having a significant internal impedance thereacross, said device being capable of exhibiting a negative resistance characteristic of the open-circuit-stable variety having a first region of relatively high positive impedance and a second region of relatively low positive impedance interconnected by a third region of negative resistance in the absence of electromagnetic wave energy radiation, and an additional negative resistance characteristic of the short-circuit-stable variety having a first region of relatively high positive impedance interconnected by a third region of negative resistance upon exposure to said radiation, wherein the frequency of said radiation is high compared to the reciprocal of the effective life-time of the minority carriers of said device; means for selectively maintaining said device in an open-circuit-stable negative resistance condition; at least one electromagnetic wave energy source, on-off control means for controlling the application of electromagnetic wave energy radiation from said source to said device; said electromagnetic wave energy source having an energy output at least sufficient to produce a negative resistance condition in said device wherein said second region of said additional open-circuit-stable negative resistance characteristic and said first region of said short-circuit-stable negative resistance interact to provide an extended relatively low positive impedance region; and output means electrically connected to said device and responsive to a negative resistance characteristic change in said device between said open-circuit-stable negative resistance condition and said unique negative resistance condition to effectively connect or disconnect said energy source and said output means.

2. The electrical switching means as defined as claim 1 wherein said device is a solid state device.

3. The electrical switching means as defined in claim 2 wherein said output means has two effective operational states, in accordance with said open-circuit-stable negative resistance condition in said device and in accordance with said negative resistance condition in said device, respectively.

4. The electrical switching means as defined in claim 2 wherein said solid state device is of the "avalanche" variety and said means for maintaining said device in an open-circuit-stable negative resistance condition includes at least one unidirectional current source adapted to bias said device.

5. The electrical switching means as defined in claim 2 wherein said solid state device has two portions, one of the avalanche variety and the other of the minority carrier storage variety and said portions are electrically connected in series arrangement.

6. The electrical switching means as defined in claim 5 wherein said portion of the avalanche variety is responsive to electromagnetic wave energy.

7. The electrical switching means as defined in claim 5 wherein said portion of the minority carrier storage variety is responsive to electromagnetic wave energy.

8. The electrical switching means as defined in claim 5 wherein both said portions are responsive to electromagnetic wave energy.

9. In a transceiver system with a single antenna and complex antenna feed means, a duplexer comprising receiver means and a device having a significant internal impedance thereacross, operatively coupled to said receiver means, said device being capable of exhibiting a negative resistance characteristic of the open-circuit-stable variety having a first region of relatively high positive impedance and a second region of relatively low positive impedance interconnected by a third region of negative resistance in the absence of electromagnetic wave energy radiation, and an additional negative resistance characteristic of the short-circuit-stable variety having a first region of relatively low positive impedance and a second region of relatively high positive impedance interconnected by a third region of negative resistance upon exposure to said radiation, wherein the frequency of said radiation is high compared to the reciprocal of the effective life-time of the minority carriers of said device; means for selectively maintaining said device in an open-circuit-stable negative resistance condition, said device being disposed in the vicinity of said antenna and subject to radiation therefrom when the transmitter of said transceiver system is energized, the disposition of said device with respect to said antenna and the magnitude of radiation therefrom being at least sufficient to produce a negative resistance condition in said device wherein said second region of said open-circuit-stable negative resistance characteristic and said first region of said short-circuit-stable negative resistance interconnect to provide an extended relatively low positive impedance region.

10. The electrical switching means as defined in claim 9 wherein said device is a solid state device.

11. The electrical switching means as defined in claim 10 wherein said solid state device is of the avalanche variety and said means for maintaining said device in an open-circuit-stable negative resistance condition includes at least one unidirectional current source adapted to bias said device.

12. The electrical switching means as defined in claim 10 wherein said solid state device has two portions, one of the avalanche variety and the other of the minority carrier storage variety and said portions are electrically connected in series arrangement.

13. The electrical switching means as defined in claim 12 wherein said portion of the avalanche variety is responsive to electromagnetic wave energy.

14. The electrical switching means as defined in claim 12 wherein said portion of the minority carrier storage variety is responsive to electromagnetic wave energy.

15. The electrical switching means as defined in claim 12 wherein both said portions are responsive to electromagnetic wave energy.

References Cited

UNITED STATES PATENTS

| | | | |
|---|---|---|---|
| 2,843,765 | 6/1958 | Aigrain | 307—88.5 |
| 2,929,922 | 3/1960 | Schawlow et al. | 325—105 X |
| 2,980,810 | 4/1961 | Goldey | 307—88.5 |
| 3,014,188 | 12/1961 | Chester et al. | 333—83 |
| 3,160,828 | 12/1964 | Strull | 307—88.5 X |
| 3,176,149 | 3/1965 | Tiemann | 307—88.5 |

FOREIGN PATENTS

| | | |
|---|---|---|
| 830,746 | 3/1960 | Great Britain. |

JOHN W. CALDWELL, *Acting Primary Examiner.*

B. V. SAFOUREK, *Assistant Examiner.*